(12) United States Patent
Chen et al.

(10) Patent No.: US 11,064,658 B2
(45) Date of Patent: Jul. 20, 2021

(54) METHOD FOR INDUCING PLANTS TO INCREASE THEIR FLAVONOID COMPOUND CONTENT

(71) Applicant: Industrial Technology Research Institute, Hsinchu (TW)

(72) Inventors: Wen-Yin Chen, Tainan (TW); Tsung-Lin Yang, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/598,703

(22) Filed: Oct. 10, 2019

(65) Prior Publication Data

US 2020/0113137 A1 Apr. 16, 2020

Related U.S. Application Data

(60) Provisional application No. 62/744,254, filed on Oct. 11, 2018.

(30) Foreign Application Priority Data

Aug. 8, 2019 (TW) ................ 10812837.1

(51) Int. Cl.
*A01H 1/04* (2006.01)
*A01G 7/04* (2006.01)

(52) U.S. Cl.
CPC ..................... *A01G 7/04* (2013.01)

(58) Field of Classification Search
CPC ....................................................... A01G 7/04
USPC ....................................................... 435/420
See application file for complete search history.

(56) References Cited

U.S. PATENT DOCUMENTS

| | | | |
|---|---|---|---|
| 8,383,390 B2 | 2/2013 | Koga et al. | |
| 9,017,444 B2 | 4/2015 | Liu et al. | |
| 9,485,991 B2 | 11/2016 | Hanson et al. | |
| 9,693,554 B2 | 7/2017 | Li et al. | |
| 2015/0376224 A1 | 12/2015 | Grison et al. | |
| 2017/0073634 A1 | 3/2017 | Okada et al. | |

FOREIGN PATENT DOCUMENTS

| | | |
|---|---|---|
| CN | 106386810 A | 2/2017 |
| TW | I408226 B1 | 9/2013 |
| WO | WO 2007/088024 A1 | 8/2007 |

OTHER PUBLICATIONS

Horbowicz et al Pol. J. Environ. Stud. vol. 22, No. 6, pp. 1723-1730, 2013.*
Skorzynska-Politetal. Acta Physilogiae Plantarum, vol. 26, No. 3, pp. 247-254, 2004.*
Derakhshani et al. Communications in Soil Science and Plant Analysis 42: 2493-2503, 2011.*
Khatami et al. International Conference on Life Science and Technology IPCBEE, vol. 3, pp. 198-201, 2011.*
Casas et al., "Flavone-rich maize: an opportunity to improve the nutritional value of an important commodity crop," Frontiers in Plant Science, vol. 5, Article 40, Sep. 2014, pp. 1-12.
Ghasemi et al., "Changes in the expression of some genes involved in the biosynthesis of secondary metabolites in *Cuminum cyminum* L. under UV stress," Protoplasma, Aug. 6, 2018, pp. 1-12.
Hassan et al., "Opportunities and feasibilities for biotechnological improvement of Zn, Cd or Ni tolerance and accumulation in plants," Environment and Experimental Botany, vol. 72, 2011, pp. 53-63.
Kidd et al., "The role of root exudates in aluminium resistance and silicon-induced amelioration of aluminium toxicity in three variety of maize," Journal of Experimental Botany, vol. 52, No. 359, Jun. 2001, pp. 1339-1352.
Ma et al., "Recent progress in the research of external Al detoxification in higher plants: a minireview," Journal of Inorganic Biochemistry, vol. 97, 2003, pp. 46-51.
Ma, "Role of Organic Acids in Detoxification of Aluminum in Higher Plants," Plant Cell Physiol., vol. 41, No. 4, 2000, pp. 383-390.
Maher et al., "Flavonoids Protect Retinal Ganglion Cells from Oxidative Stress-Induced Death," Investigative Ophthalmology & Visual Science, vol. 46, No. 12, Dec. 2005, pp. 4796-4803.
Mossor-Pietraszewska, "Effect of aluminium on plant growth and metabolism," Acta Biochimica Polonica, vol. 48, No. 3, 2001, pp. 673-686.
Qiu et al., "Interaction of cadmium and zinc on accumulation and sub-cellular distribution in leaves of hyperaccumulator *Potentilla griffithii*," Journal of Hazardous Materials, vol. 186, 2011, pp. 1425-1430.
Ramakrishna et al., "Influence of abiotic stress signals on secondary metabolites in plants," Plant Signaling & Behavior, vol. 6, Issue 11, 2011, pp. 1720-1731.
Schmitt et al., "The effects of aluminium on plant growth in a temperate and deciduous aluminium accumulating species," AoB Plants, 2016, pp. 1-13.
Yang et al., "Cell Wall Polysaccharides Are Specifically Involved in the Exclusion of Aluminum from the Rice Root Apex," Plant Physiology, vol. 146, Feb. 2008, pp. 602-611.
Harborne et al., "Chemosystematics of the Compositae: Flavonoid Patterns in the Chrysanthemum Complex of the Tribe Anthemideae," Phytochemistry, vol. 9, 1970, pp. 2011-2017.
Taiwanese Office Action and Search Report, dated Dec. 15, 2020, for Taiwanese Application No. 108128371.

* cited by examiner

*Primary Examiner* — Keith O. Robinson
(74) *Attorney, Agent, or Firm* — Birch, Stewart, Kolasch & Birch, LLP

(57) ABSTRACT

A method for inducing plants to increase their flavonoid compound content, includes performing an induction culture on a young shoot or an adult of a living plant, wherein flavonoid compound content of the young shoot or the adult of the living plant which has been subjected to the induction culture is higher than that of a young shoot or an adult of a living plant which is not subjected to the induction culture. Moreover, the induction culture includes a metal ion stimulation procedure comprising culturing the young shoot or the adult of the living plant in a culture environment with metal ion stimulation, wherein the culture environment with metal ion stimulation contains a metal ion used for stimulating the living plant, and the concentration of the metal ion used for stimulating the living plant is 5 μM-50 mM.

34 Claims, 11 Drawing Sheets

METHOD FOR INDUCING PLANTS TO INCREASE THEIR FLAVONOID COMPOUND CONTENT

CROSS REFERENCE TO RELATED APPLICATION

This application claims the benefit of U.S. Provisional Application No. 62/744,254 filed on Oct. 11, 2018, the entirety of which is incorporated by reference herein.

The present application is based on, and claims priority from, Taiwan Application Serial Number 108128371, filed on Aug. 8, 2019, the disclosure of which is hereby incorporated by reference herein in its entirety.

TECHNICAL FIELD

The technical field relates to a method for producing a plant's medicinal ingredients, and it particularly relates to a method for inducing plants to increase their flavonoid compound content.

BACKGROUND

The tolerance mechanism of plants to metals can be classified into two types: stress avoidance and stress tolerance. By the mechanism of stress avoidance, heavy metals are not absorbed by the roots of plants. Plants with stress tolerance are also known as accumulator species, which absorb heavy metals that accumulate in the leaves. The ways in which plants tolerate heavy metals all involve the combination of organic molecules with metallic elements.

Generally, the content of the medicinal component (secondary metabolite) presented in the plant is low, and in this case, when the impurity content is high, the cost of back-end extraction and purification processing will be high.

Therefore, there is a need for a novel method for inducing the accumulation of secondary metabolites in plants and increasing the yield of the desired components.

SUMMARY

The present disclosure provides a method for inducing plants to increase their flavonoid compound content, comprising: performing an induction culture on a young shoot or an adult of a living plant, wherein flavonoid compound content of the young shoot or the adult of the living plant which has been subjected to the induction culture is higher than that of a young shoot or an adult of a living plant which is not subjected to the induction culture. Moreover, the induction culture comprises: a metal ion stimulation procedure comprising culturing the young shoot or the adult of the living plant in a culture environment with metal ion stimulation, wherein the culture environment with metal ion stimulation contains a metal ion used for stimulating the living plant, and the concentration of the metal ion used for stimulating the living plant is 5 μM-50 mM.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION

Figure 1:
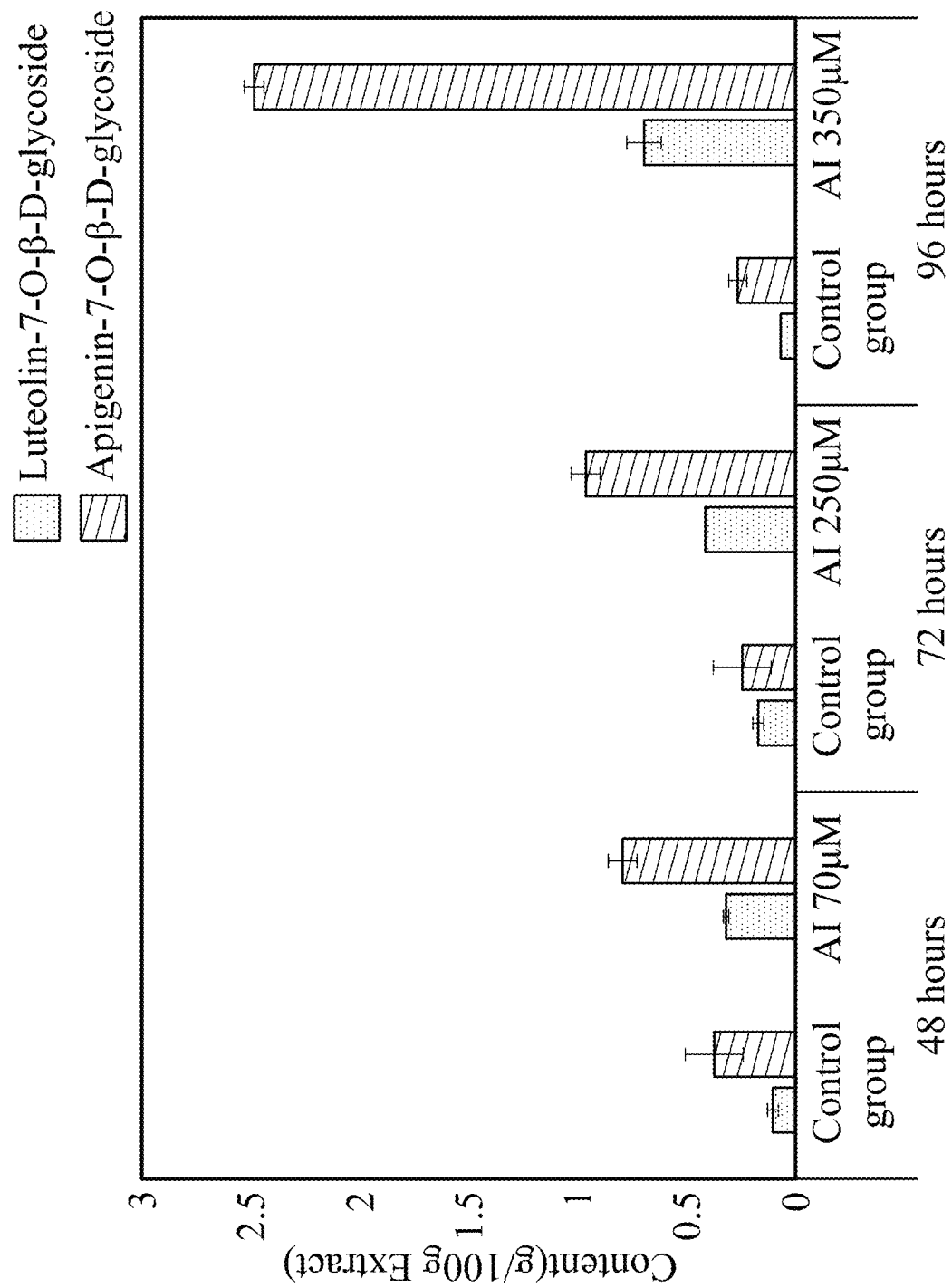
FIG. 1 shows the contents of luteolin-7-O-β-D-glycoside and apigenin-7-O-β-D-glycoside of whole plants of *Chrysanthemum morifolium* stimulated by Al ion for different lengths of time in a hydroponic culture environment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure a method for inducing plants to increase their flavonoid compound content.

The expression "inducing plants to increase their flavonoid compound content" used herein refers to inducing plants to increase total flavonoid content contained thereby, or inducing plants to increase any one kind of flavonoid compound contained thereby or any combination of flavonoid compounds contained thereby, and has no particular limitation. In one embodiment, "inducing plants to increase their flavonoid compound content" refers to inducing plants to increase total flavonoid content contained thereby. In another embodiment, "inducing plants to increase their flavonoid compound content" refers to inducing plants to increase any one kind of flavonoid compound contained thereby or any combination of flavonoid compounds contained thereby, such as luteolin, luteolin-7-O-3-D-glycoside, apigenin, apigenin-7-O-β-D-glycoside, catechin, rutin or any combination thereof, but it is not limited thereto.

Moreover, there is no particular limitation to a part of the plant increasing flavonoid compound, for example, the part of the plant increasing flavonoid compound may be whole plant, root, stem, leaf, flower and/or fruit of the plant.

The method for inducing plants to increase their flavonoid compound content of the present disclosure mentioned above, may comprise, but is not limited to, performing an induction culture to a young plant or an adult of a living plant. The flavonoid compound content of the young shoot or the adult of the living plant which has been subjected to the induction culture is higher than that of a young shoot or an adult of a living plant which is not subjected to the induction culture.

The "living plant" mentioned herein, may be any living plant and has no particular limitation. In one embodiment, the living plant may comprise a plant belonging to the family Asteraceae (or Compositae), but is not limited thereto. Examples for the plant belonging to the family Asteraceae (or Compositae) may comprises, but are not limited to a plant belonging to the genus *Chrysanthemum* or the genus *Ixeris*. Moreover, example for the plant belonging to the genus *Chrysanthemum* mentioned above may comprise *Chrysanthemum morifolium, Chrysanthemum coronarium* or *Chrysanthemum indicum*, but it is not limited thereto. Examples of plants belonging to the genus *Ixeris* as mentioned above may comprise, but are not limited to, *Ixeris chinensis* and *Ixeris dentat.*

Furthermore, "a young shoot of a living plant" mentioned herein refers to a living plant in a vegetative growth stage in which a plant has the most vigorous growth. "An adult of a living plant" mentioned herein refers to a living plant in a reproductive growth stage in which a plant is capable of blooming and/or fruiting.

The foregoing induction culture in the method for inducing plants to increase their flavonoid compound content of the present disclosure may comprise, but is not limited to, a metal ion stimulation procedure. Moreover, the metal ion stimulation procedure mentioned above may comprise culturing the young shoot or the adult of the living plant in a culture environment with metal ion stimulation, wherein the foregoing culture environment with metal ion stimulation contains a metal ion used for stimulating the living plant, and in the foregoing culture environment with metal ion stimulation, the concentration of the metal ion used for stimulating the living plant may be 5 μM-50 mM, but it is not limited thereto.

Furthermore, the time it takes to perform the metal ion stimulation procedure in the above induction culture depends on the culture conditions at that time, and is not particularly limited, as long as it is sufficient for the root of the living plant to be stimulated by the metal ion used for stimulating the living plant mentioned above, for example, it may be about 5 hours-50 days. In a condition of without waiting for the growth of the roots of living plants, the time it takes to perform the metal ion stimulation procedure in the above induction culture may be shorter, such as about 5-120 hours, but it is not limited thereto. In contrast, in a condition where it is necessary to wait for the growth of the roots of the living plant, longer time it takes to perform the metal ion stimulation procedure in the above induction culture is required, for example, about 20-50 days, but is not limited thereto.

In the metal ion stimulation procedure mentioned above, the aforementioned culture environment with metal ion stimulation has no particular limitation, as long as it can allow the root of the living plant to be stimulated by the metal ion used for stimulating the living plant mentioned above. For example, the aforementioned culture environment with metal ion stimulation may comprise, but is not limited to the culture environment with metal ion stimulation comprises an environment of hydroponic culture, solid medium culture or soil culture. The culture medium used for hydroponic culture and solid medium culture is not particularly limited, as long as it can allow the plant to grow. In one embodiment, culture medium used for hydroponic culture and solid medium culture may be MS medium, but it is not limited thereto.

In one embodiment, the aforementioned culture environment with metal ion stimulation is a hydroponic culture, and the time it takes to perform the metal ion stimulation procedure mentioned above may be 5-120 hours, but it is not limited thereto. In another embodiment, the aforementioned culture environment with metal ion stimulation is a solid medium culture, and the time it takes to perform the metal ion stimulation procedure mentioned above may be 20-50 days, but it is not limited thereto. In another embodiment, the aforementioned culture environment with metal ion stimulation is a soil culture, and the time it takes to perform the metal ion stimulation procedure mentioned above may be 5-120 hours, but it is not limited thereto.

Furthermore, in the aforementioned culture environment with metal ion stimulation, the concentration of the metal ion used for stimulating the living plant may be adjusted according to the culture manner and/or the ion species of the metal ion used for stimulating the living plant used, and has no particular limitation. For example, in a culture manner in which the contact between the roots of the living plant and the metal ion used for stimulating the living plant is less susceptible to interference by other ingredients and/or space barrier, a lower concentration can be used for the metal ion used for stimulating the living plant, such as about 5 μM-50 mM, about 25 μM-50 mM, about 50 μM-45 mM, about 0.1 mM-5 mM, about 100 μM, about 250 μM, about 350 μM, about 1.25 mM, about 2.5 mM, about 15 mM, about 30 mM, about 45 mM, but it is not limited thereto. In contrast, for example, in a culture manner in which the contact between the roots of the living plant and the metal ion used for stimulating the living plant may be more susceptible to interference by other ingredients and/or space barrier (such as soil culture), a higher concentration can be used for the metal ion used for stimulating the living plant, such as about 0.5 mM-50 mM, about 1 mM-3 mM, about 1.25 mM, about 2.5 mM, but it is not limited thereto.

In one embodiment, the aforementioned culture environment with metal ion stimulation is a hydroponic culture, and the concentration of the metal ion used for stimulating the living plant mentioned above may be about 5 μM-50 mM, such as about 50 μM-5 mM, about 50 μM-300 μM, about 100 μM-250 μM, about 1.25 mM, about 2.5 mM, but it is not limited thereto.

In one embodiment, the aforementioned culture environment with metal ion stimulation is a solid medium culture, and the concentration of the metal ion used for stimulating the living plant mentioned above may be about 50 µM-50 mM, such as about 100 µM-250 µM, about 100 µM-350 µM, about 15 mM-45 mM, but it is not limited thereto.

In one embodiment, the aforementioned culture environment with metal ion stimulation is a soil culture, and the concentration of the metal ion used for stimulating the living plant mentioned above may be about 0.5 mM-50 mM, such as about 0.5 mM-5 mM, about 1 mM-3 mM, about 1.25 mM, about 2.5 mM, but it is not limited thereto.

In addition, in the aforementioned culture environment with metal ion stimulation, the species of the metal ion and the number of the species of the metal ion are not particularly limited, as long as the metal ion can stimulates the roots of the living plant to induce to increase the content of flavonoid compound thereof. For example, in the aforementioned culture environment with metal ion stimulation, the metal ion used for stimulating the living plant may comprise aluminum ion, copper ion, zinc ion or any combination thereof, but it is not limited thereto.

When the aforementioned culture environment with metal ion stimulation is a hydroponic culture, in one specific embodiment, the metal ion used for stimulating the living plant may be aluminum ion or copper ion, and the concentration thereof may be about 5 µM-5 mM, but it is not limited thereto. Moreover, when the aforementioned culture environment with metal ion stimulation is a hydroponic culture, in another specific embodiment, the metal ion used for stimulating the living plant may be zinc ion, and the concentration thereof may be about 3.5 mM-50 mM, but it is not limited thereto.

When the aforementioned culture environment with metal ion stimulation is a solid medium culture, in one specific embodiment, the metal ion used for stimulating the living plant may be aluminum ion or copper ion, and the concentration thereof may be about 50 µM-5 mM, but it is not limited thereto. Moreover, when the aforementioned culture environment with metal ion stimulation is a solid medium culture, in another specific embodiment, the metal ion used for stimulating the living plant may be zinc ion, and the concentration thereof may be about 3.5 mM-50 mM, but it is not limited thereto.

When the aforementioned culture environment with metal ion stimulation is a soil culture, in one specific embodiment, the metal ion used for stimulating the living plant may be aluminum ion, and the concentration thereof may be about 0.5 mM-50 mM, but it is not limited thereto.

Furthermore, in the method for inducing plants to increase their flavonoid compound content of the present disclosure, the induction culture mentioned above, in addition to the metal ion stimulation procedure mentioned above, may further comprise an ultraviolet irradiation procedure to irradiate the young shoot or the adult of the living plant with ultraviolet.

The metal ion stimulation procedure mentioned above combined with the ultraviolet irradiation procedure, compared with the metal ion stimulation procedure or the ultraviolet irradiation procedure alone, may have an additive or synergistic effect on inducing plants to increase the content of flavonoid compounds thereof.

The ultraviolet irradiation procedure may be performed during the metal ion stimulation procedure mentioned above or may be performed after the end of the metal ion stimulation procedure mentioned above, and there is no particular limitation. In one embodiment, the ultraviolet irradiation procedure may be performed during the metal ion stimulation procedure mentioned above and be performed after the beginning of the metal ion stimulation procedure mentioned above.

In addition, the time it takes to perform the ultraviolet irradiation procedure may depend on the living plant used and/or its growth condition, and is not particularly limited. For example, the time it takes to perform the ultraviolet irradiation procedure may be about 0.5-5 hours, about 0.5-4 hours, about 1-4 hours, about 1 hour, about 2 hours, about 3 hours, about 4 hours, but it is not limited thereto.

The type of ultraviolet used in the aforementioned ultraviolet irradiation procedure also can depend on the living plant used and/or its growth condition, and is not particularly limited. For example, ultraviolet A (UV-A), ultraviolet B (UV-B), ultraviolet C (UV-C) or any combination thereof may be used. In one embodiment, the living plant used in the method for inducing plants to increase their flavonoid compound content of the present disclosure may be a plant belonging to the family Asteraceae, and the ultraviolet used in the ultraviolet irradiation procedure may be ultraviolet B, but it is not limited thereto.

In one specific embodiment, the aforementioned induction culture comprises the metal ion stimulation procedure and the ultraviolet irradiation procedure, and in the metal ion stimulation procedure, the culture environment with metal ion stimulation is a hydroponic culture, and the concentration of the metal ion used for stimulating the living plant is 5 µM-50 mM, and the time it takes to perform the metal ion stimulation procedure is about 5-120 hours. Moreover, in this specific embodiment, the ultraviolet irradiation procedure may be performed during the metal ion stimulation procedure mentioned above and be performed after 4.5-115 hours from the beginning of the metal ion stimulation procedure, and the time it takes to perform the ultraviolet irradiation procedure mentioned above may be about 0.5-5 hours.

In another specific embodiment, the aforementioned induction culture comprises the metal ion stimulation procedure and the ultraviolet irradiation procedure, and in the metal ion stimulation procedure, the culture environment with metal ion stimulation is a solid medium culture, and the concentration of the metal ion used for stimulating the living plant is 50 µM-50 mM, and the time it takes to perform the metal ion stimulation procedure is 20-50 days. Moreover, in this specific embodiment, the ultraviolet irradiation procedure may be performed during the metal ion stimulation procedure mentioned above and be performed after 19-49 days from the beginning of the metal ion stimulation procedure, and the time it takes to perform the ultraviolet irradiation procedure mentioned above may be about 0.5-5 hours.

In another specific embodiment, the aforementioned induction culture comprises the metal ion stimulation procedure and the ultraviolet irradiation procedure, and in the metal ion stimulation procedure, the culture environment with metal ion stimulation is a soil culture, and the concentration of the metal ion used for stimulating the living plant is about 0.5 mM-50 mM, and the time it takes to perform the metal ion stimulation procedure is about 5-120 hours. Moreover, in this specific embodiment, the ultraviolet irradiation procedure may be performed during the metal ion stimulation procedure mentioned above and be performed after 4.5-115 hours from the beginning of the metal ion stimulation procedure, and the time it takes to perform the ultraviolet irradiation procedure mentioned above may be about 0.5-5 hours.

Furthermore, in the method for inducing plants to increase their flavonoid compound content of the present disclosure, the aforementioned induction culture, in addition to the metal ion stimulation procedure mentioned above and the ultraviolet irradiation procedure, may further comprise a recovery procedure after the ultraviolet irradiation procedure. The recovery procedure mentioned above refers to giving time to let the young shoot or the adult of the living plant self-repair after the ultraviolet irradiation stops.

The time it takes to perform the aforementioned recovery procedure is not particularly limited, and may depend on the living plant used and/or growth condition thereof at that time and/or influence degree by ultraviolet thereof. For example, the time it takes to perform the aforementioned recovery procedure may be about 0.5-8 hours, about 0.5-7 hours, about 1-6 hours, about 1 hour, about 3 hours, about 6 hours, but it is not limited thereto.

In one embodiment, the aforementioned induction culture comprises the metal ion stimulation procedure, the ultraviolet irradiation procedure and the recovery procedure, and the ultraviolet irradiation procedure and the recovery procedure both are performed during the metal ion stimulation procedure. In addition, the ultraviolet irradiation procedure may be performed after the beginning of the metal ion stimulation procedure mentioned above.

In another embodiment, the aforementioned induction culture comprises the metal ion stimulation procedure, the ultraviolet irradiation procedure and the recovery procedure, and the ultraviolet irradiation procedure and the recovery procedure both are performed after the end of the metal ion stimulation procedure.

Furthermore, the method for inducing plants to increase their flavonoid compound content of the present disclosure, in addition to the aforementioned induction culture, may further comprise performing an extraction step on the young shoot or the adult of the living plant after the induction culture to extract the flavonoid compounds of the living plant.

In one embodiment, the method for inducing plants to increase their flavonoid compound content of the present disclosure may comprise the aforementioned induction culture and the aforementioned extraction step, wherein in the metal ion stimulation procedure of the induction culture mentioned above, the aforementioned culture environment with metal ion stimulation is a hydroponic culture or solid medium culture, and the young shoot or the adult of the living plant mentioned above is the adult of the living plant is the young shoot of the living plant, and the extraction step is performed on the whole plant of the living plant.

In another embodiment, the method for inducing plants to increase their flavonoid compound content of the present disclosure may comprise the aforementioned induction culture and the aforementioned extraction step, wherein in the metal ion stimulation procedure of the induction culture mentioned above, the aforementioned culture environment with metal ion stimulation is a hydroponic culture, and the young shoot or the adult of the living plant mentioned above is the adult of the living plant, and the extraction step is performed on the flowers and pedicels of the living plant.

In another embodiment, the method for inducing plants to increase their flavonoid compound content of the present disclosure may comprise the aforementioned induction culture and the aforementioned extraction step, wherein in the metal ion stimulation procedure of the induction culture mentioned above, the aforementioned culture environment with metal ion stimulation is a soil culture, and the young shoot or the adult of the living plant mentioned above is the adult of the living plant, and the extraction step is performed on the flowers of the living plant.

By the method for inducing plants to increase their flavonoid compound content of the present disclosure, the content of flavonoid compounds in plants can be effectively increased to more effectively increase the yield of flavonoid compounds derived from plants. Moreover, in the present disclosure, it has also been first confirmed that the combination of metal ion stimulation and ultraviolet irradiation may has the synergistic effect have additive or synergistic effects on the induction of plants to increase the content of flavonoid compound thereof as compared to the metal ion stimulation procedure or the ultraviolet irradiation procedure alone.

EXAMPLES

Example 1

Effects of different lengths of time of Al ion stimulation on the content of luteolin-7-O-β-D-glycoside and apigenin-7-O-β-D-glycoside of whole plant of *Chrysanthemum morifolium* in a hydroponic culture environment A. Methods 1. MS liquid medium was prepared based on the formulation of Table 1 shown in the following.

TABLE 1

| | Ingredient | Content (Actual concentration used) |
|---|---|---|
| | $KH_2PO_4$ | 0.17 g/L |
| | $NH_4NO_3$ | 1.65 g/L |
| | $KNO_3$ | 1.9 g/L |
| | $CaCl_2 \cdot 2H_2O$ | 0.44 g/L |
| | $MgSO_4 \cdot 7H_2O$ | 0.37 g/L |
| | $Na_2EDTA \cdot 2H_2O$ | 37.3 mg/L |
| | $FeSO_4 \cdot 7H_2O$ | 22.8 mg/L |
| Complex salt solution | $H_3BO_3$ | 6.2 mg/L |
| | $MnSO_4 \cdot 4H_2O$ | 16.9 mg/L |
| | $ZnSO_4 \cdot 7H_2O$ | 8.6 mg/L |
| | KI | 0.83 mg/L |
| | $Na_2MoO_4 \cdot 2H_2O$ | 0.25 mg/L |
| | $CoCl_2 \cdot 6H_2O$ | 0.025 mg/L |
| | $CuSO_4 \cdot 5H2O$ | 0.025 mg/L |
| Vitamin complex solution | Vitamin B1 (Thiamine HCl; $C_{12}H_{18}C_{12}N_4OS$) | 1 mg/L |
| | Vitamin B6 (Pyridoxine HCl; $C_6H_{12}ClNO_3$) | 0.5 mg/L |
| | Vitamin B3 (nicotinic acid; $C_6H_5NO_2$) | 0.5 mg/L |
| | Glycine ($C_2H_5NO_2$) | 2 mg/L |
| Myo-inositol ($C_6H_{12}O_6$) | | 100 mg/L |
| Sucrose ($C_{12}H_{22}O_{11}$) | | 30 g/L |

2. Different amounts of $AlCl_3$ solution were added to the MS liquid medium prepared above to respectively form MS liquid mediums with $AlCl_3$ final concentrations of 0 μM (control group), 70 μM, 250 μM and 350 μM for ready for use.

3. Tissue culture seedlings of *Chrysanthemum morifolium* (young shoot of *Chrysanthemum morifolium*) were taken out from solid culture tubes. After that, the solid medium on the root of the plants was washed with water, and the whole plants were inserted into test tubes containing the MS liquid medium with different $AlCl_3$ final concentration prepared above, and the roots of the plants were immersed in the liquid medium. Finally, the above-ground parts of the plants were covered with sealed bags to protect the cuticula on the surfaces of the plant leaves to prevent rapid evapotranspiration of water.

4. After being immersed for 48, 72 and 96 hours, the morphological changes of the plants were observed and the samples of whole plants were collected. Then, the collected samples were lyophilized.

5. After the lyophilization, extraction was performed on the whole plant of *Chrysanthemum morifolium*. The extraction method used was water extraction, and the dried plant and deionized water were mixed at a ratio of 1:20 (g/mL) (i.e., 1 g dry weight of plant was added to 20 mL of deionized water) to form a mixture. Using a condensing heating system, the mixture was heated to boiling for 90 minutes to complete the extraction and obtain an extract solution. The plant residue in the extract solution was removed by filtration, and then the extract solution was further lyophilized to obtain an extract.

6. High-performance liquid chromatography (HPLC) was performed on the extract mentioned above to determine the contents of luteolin-7-O-β-D-glycoside and apigenin-7-O-β-D-glycoside which belong to flavonoid compounds.

B. Results

The results are shown in FIG. 1.

FIG. 1 shows the contents of luteolin-7-O-β-D-glycoside and apigenin-7-O-β-D-glycoside of whole plants of *Chrysanthemum morifolium* stimulated by Al ion for different lengths of time in a hydroponic culture environment.

According to FIG. 1, it is known that, compared to the control group, the content of luteolin-7-O-β-D-glycoside and apigenin-7-O-β-D-glycoside belonging to flavonoid compounds of the plants stimulated by Al ions was significantly increased, and had a dose effect. This result confirms that Al ion stimulation has the effect of inducing the accumulation of flavonoid ingredients in plants.

Example 2

Effects of different concentrations of Al ion stimulation on the content of luteolin-7-O-β-D-glycoside and apigenin-7-O-β-D-glycoside of whole plant of *Chrysanthemum morifolium* in a hydroponic culture environment A. Methods 1. MS liquid medium was prepared based on the formulation of Table 1 shown above.

2. Different amounts of $AlCl_3$ solution were added to the MS liquid medium prepared above to respectively form MS liquid mediums with $AlCl_3$ final concentrations of 0 μM (control group), 100 μM, 150 μM, 200 μM and 250 μM for ready for use.

3. Tissue culture seedlings of *Chrysanthemum morifolium* (young shoot of *Chrysanthemum morifolium*) were taken out from solid culture tubes. After that, the solid medium on the root of the plants was washed with water, and the whole plants were inserted into test tubes containing the MS liquid medium with different $AlCl_3$ final concentration prepared above, and the roots of the plants were immersed in the liquid medium. Finally, the above-ground parts of the plants were covered with sealed bags to protect the cuticula on the surfaces of the plant leaves to prevent rapid evapotranspiration of water.

4. After being immersed for 72 hours, the morphological changes of the plants were observed and the samples of whole plants were collected. Then, the collected samples were lyophilized.

5. After the lyophilization, extraction was performed on the whole plant of *Chrysanthemum morifolium*. The extraction method used was water extraction, and the dried plant and deionized water were mixed at a ratio of 1:20 (g/mL) (i.e., 1 g dry weight of plant was added to 20 mL of deionized water) to form a mixture. Using a condensing heating system, the mixture was heated to boiling for 90 minutes to complete the extraction and obtain an extract solution. The plant residue in the extract solution was removed by filtration, and then the extract solution was further lyophilized to obtain an extract.

6. High-performance liquid chromatography was performed on the extract mentioned above to determine the contents of luteolin-7-O-β-D-glycoside and apigenin-7-O-β-D-glycoside which belong to flavonoid compounds.

B. Results

Figure 2A:
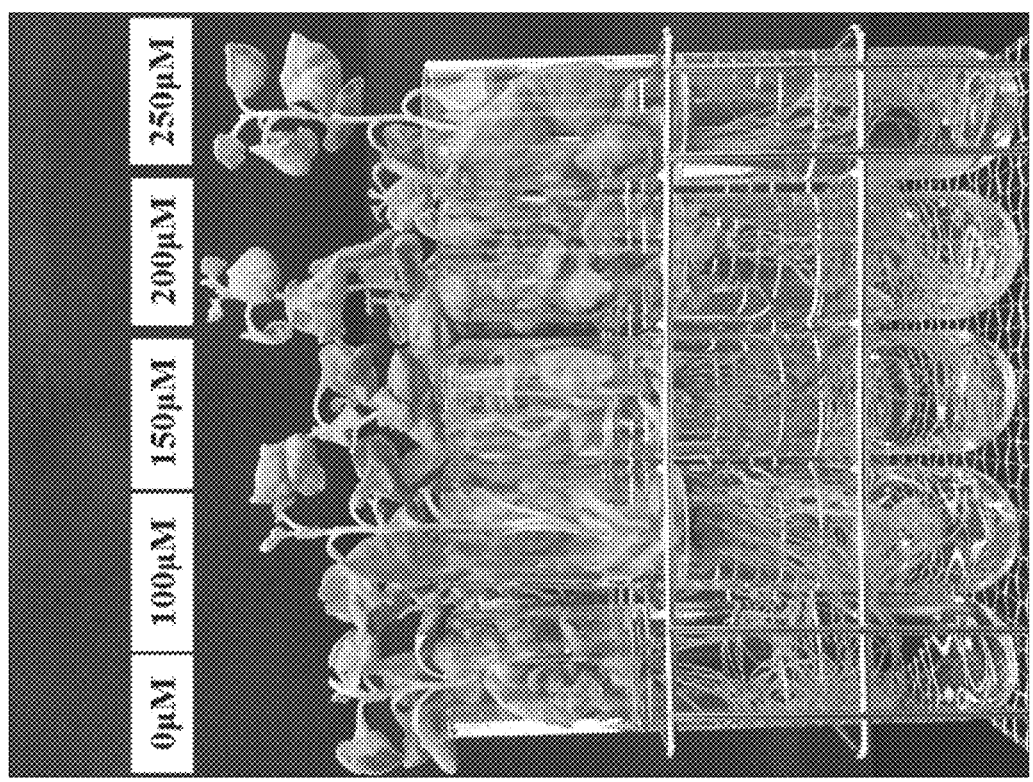
FIG. 2A is a photograph of the appearance of whole plants of *Chrysanthemum morifolium* stimulated by different concentrations of Al ion for 72 hours in a hydroponic culture environment.
Figure 2B:
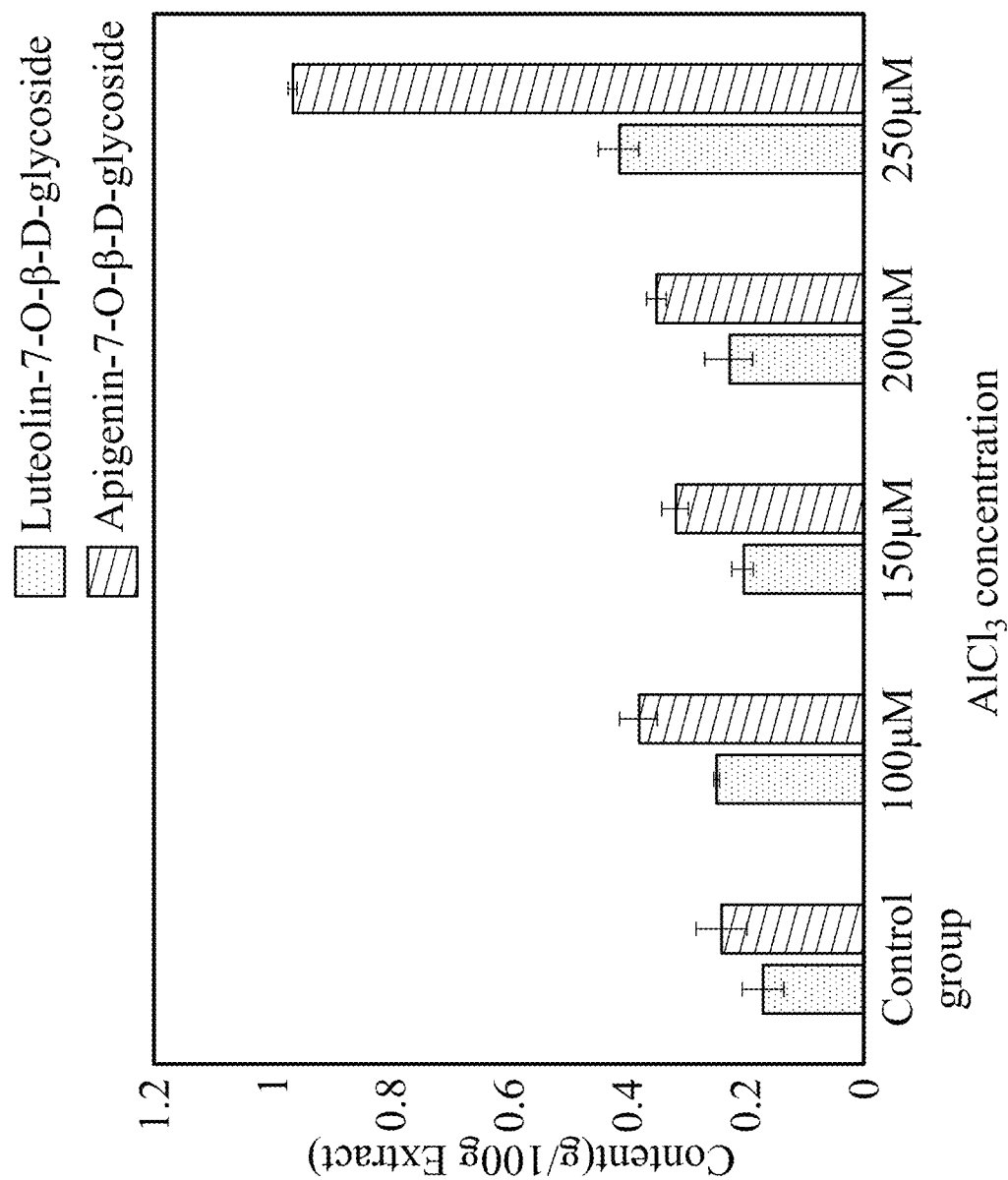
FIG. 2B shows the contents of luteolin-7-O-β-D-glycoside and apigenin-7-O-β-D-glycoside of whole plants of *Chrysanthemum morifolium* stimulated by different concentrations of Al ion for 72 hours in a hydroponic culture environment.

The results are shown in FIGS. 2A and 2B.

FIG. 2A is a photograph of the appearance of whole plants of *Chrysanthemum morifolium* stimulated by different concentrations of Al ion for 72 hours in a hydroponic culture environment. FIG. 2B shows the contents of luteolin-7-O-β-D-glycoside and apigenin-7-O-β-D-glycoside of whole plants of *Chrysanthemum morifolium* stimulated by different concentrations of Al ion for 72 hours in a hydroponic culture environment.

Based on FIG. 2B, it is known that, compared to the control group, the contents of luteolin-7-O-β-D-glycoside and apigenin-7-O-β-D-glycoside belonging to flavonoid compounds of the plants stimulated by Al ions are significantly increased about twofold to threefold. This result confirms that Al ion stimulation has the effect of inducing the accumulation of flavonoid ingredients in plants.

Example 3

Effects of different concentrations of Al ion stimulation on the contents of luteolin, luteolin-7-O-β-D-glycoside, apigenin and apigenin-7-O-β-D-glycoside of flowers of *Chrysanthemum morifolium* in a soil culture environment A. Methods 1. $AlCl_3$ solutions with concentrations of 1.25 mM and 2.5 mM were prepared, respectively.

2. The flowering plants of *Chrysanthemum morifolium* (adult of *Chrysanthemum morifolium*) cultured by soil culture together with the soil and flower pots where the plants were located, were immersed in the $AlCl_3$ solutions prepared above.

3. After being immersed for 96 hours, the morphological changes of the plants were observed and the samples of flowers were collected and lyophilized.

4. After the lyophilization, extraction was performed on the flowers of *Chrysanthemum morifolium*. The extraction method used was water extraction, and the dried flowers and deionized water were mixed at a ratio of 1:20 (g/mL) (i.e., 1 g dry weight of flowers was added to 20 mL of deionized water) to form a mixture. Using a condensing heating system, the mixture was heated to boiling for 90 minutes to complete the extraction and obtain an extract solution. The plant residue in the extract solution was removed by filtration, and then the extract solution was further lyophilized to obtain an extract.

B. Results

Figure 3:
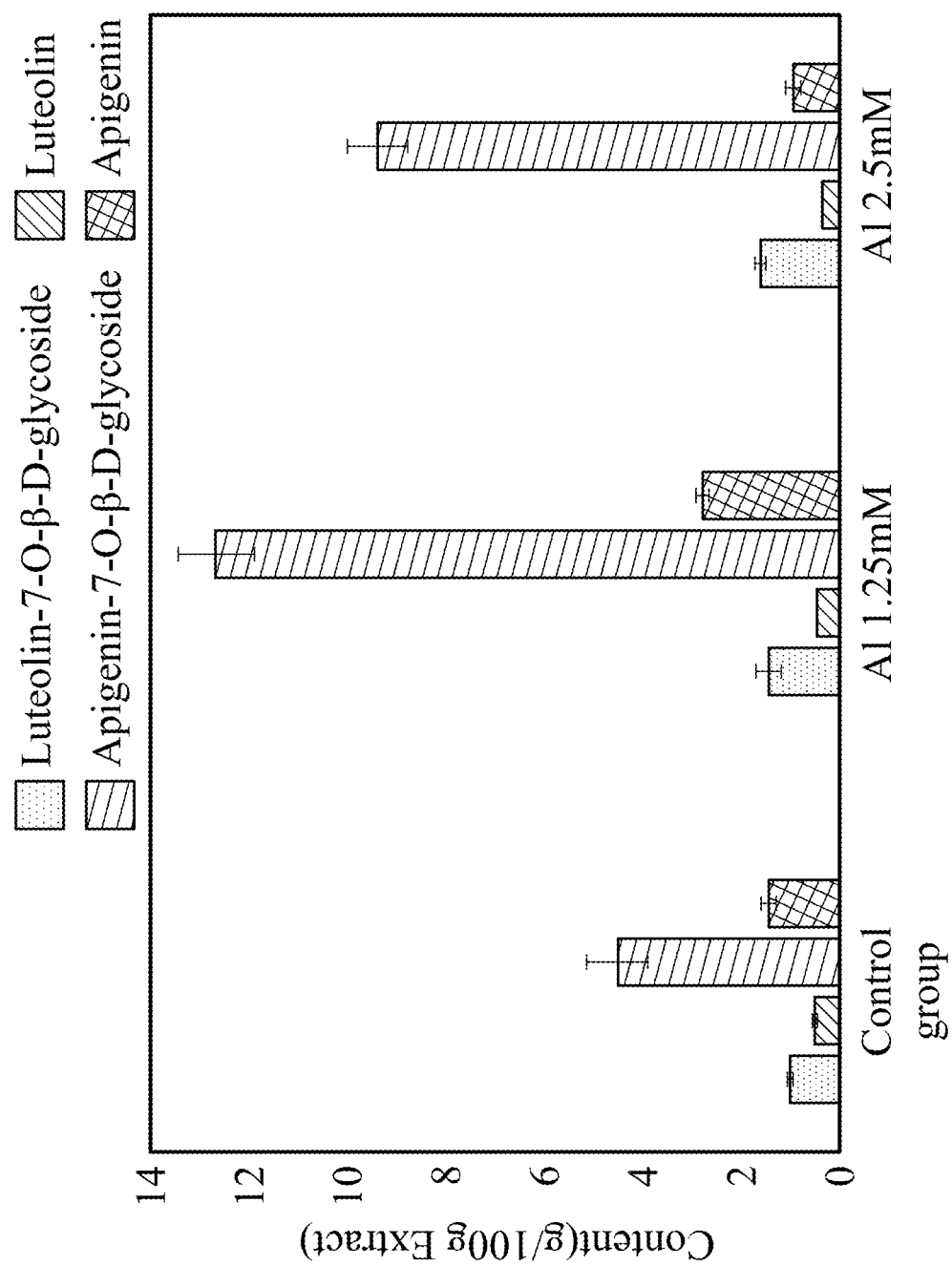
FIG. 3 shows the contents of luteolin, luteolin-7-O-β-D-glycoside, apigenin and apigenin-7-O-β-D-glycoside of the flowers of *Chrysanthemum morifolium* plants stimulated by different concentrations of Al ion for 96 hours in a soil culture environment.

The results are shown in FIG. 3.

FIG. 3 shows the contents of luteolin, luteolin-7-O-β-D-glycoside, apigenin and apigenin-7-O-β-D-glycoside of the flowers of *Chrysanthemum morifolium* plants stimulated by different concentrations of Al ion for 96 hours in a soil culture environment.

Based on FIG. 3, it is known that, compared to the control group, except for luteolin, the contents of other ingredients belonging to flavonoid compounds of the flowers of the plants stimulated by Al ions are significantly increased. This result confirms that for soil culture environment and different parts of plants, Al ion stimulation also has the effect of inducing the accumulation of flavonoid ingredients in plants.

Example 4

Effects of different concentrations of Zn ion stimulation on the contents of luteolin-7-O-β-D-glycoside and apigenin-7-O-β-D-glycoside of whole plant of Chrysanthemum morifolium in a solid medium culture environment A. Methods 1. Different amounts of $ZnSO_4$ were added to the formulation of Table 2 shown in the following to respectively form MS solid mediums with different Zn ion final concentration of 3 mM (control group), 15 mM, 30 mM and 45 mM for ready for use.

TABLE 2

| Ingredient | | Content (Actual concentration used) |
|---|---|---|
| $KH_2PO_4$ | | 0.17 g/L |
| $NH_4NO_3$ | | 1.65 g/L |
| $KNO_3$ | | 1.9 g/L |
| $CaCl_2 \cdot 2H_2O$ | | 0.44 g/L |
| $MgSO_4 \cdot 7H_2O$ | | 0.37 g/L |
| $Na_2EDTA \cdot 2H_2O$ | | 37.3 mg/L |
| $FeSO_4 \cdot 7H_2O$ | | 22.8 mg/L |
| Complex | $H_3BO_3$ | 6.2 mg/L |
| salt | $MnSO_4 \cdot 4H_2O$ | 16.9 mg/L |
| solution | $ZnSO_4 \cdot 7H_2O$ | 8.6 mg/L |
| | KI | 0.83 mg/L |
| | $Na_2MoO_4 \cdot 2H_2O$ | 0.25 mg/L |
| | $CoCl_2 \cdot 6H_2O$ | 0.025 mg/L |
| | $CuSO_4 \cdot 5H_2O$ | 0.025 mg/L |
| Vitamin | Vitamin B1 (Thiamine HCl; | 1 mg/L |
| complex | $C_{12}H_{18}C_{12}N_4OS$) | |
| solution | Vitamin B6 (Pyridoxine HCl; | 0.5 mg/L |
| | $C_6H_{12}ClNO_3$) | |
| | Vitamin B3 (nicotinic acid; $C_6H_5NO_2$) | 0.5 mg/L |
| | Glycine ($C_2H_5NO_2$) | 2 mg/L |
| Myo-inositol ($C_6H_{12}O_6$) | | 100 mg/L |
| Sucrose ($C_{12}H_{22}O_{11}$) | | 30 g/L |
| Agarose + Agaropectin | | 3.3 g/L |

2. A terminal bud of a tissue culture seedling of Chrysanthemum morifolium (young shoot of Chrysanthemum morifolium) was cut and inserted to the solid medium prepared above (since a rooted plant was not easy to insert into solid medium, the experiment was performed in this way) to perform the solid medium culture. Since Zn is mainly absorbed by the roots of plants, the evaluation only could start after the plant had grown roots. The Zn element could be absorbed and utilized by the plant only after the plant had grown roots. Plants were allowed to absorb zinc during growth and development, thereby causing changes in physiological and compositional components in the plants.

3. After being cultured for 40 days, the morphological changes of the plants were observed and the samples of whole plants were collected. Then, the collected samples were lyophilized.

4. After the lyophilization, extraction was performed on the whole plant of Chrysanthemum morifolium. The extraction method used was water extraction, and the dried plant and deionized water were mixed at a ratio of 1:20 (g/mL) (i.e., 1 g dry weight of plant was added to 20 mL of deionized water) to form a mixture. Using a condensing heating system, the mixture was heated to boiling for 90 minutes to complete the extraction and obtain an extract solution. The plant residue in the extract solution was removed by filtration, and then the extract solution was further lyophilized to obtain an extract.

6. High-performance liquid chromatography (HPLC) was performed on the extract mentioned above to determine the contents of luteolin-7-O-β-D-glycoside and apigenin-7-O-β-D-glycoside which belong to flavonoid compounds, respectively.

B. Results

Figure 4:
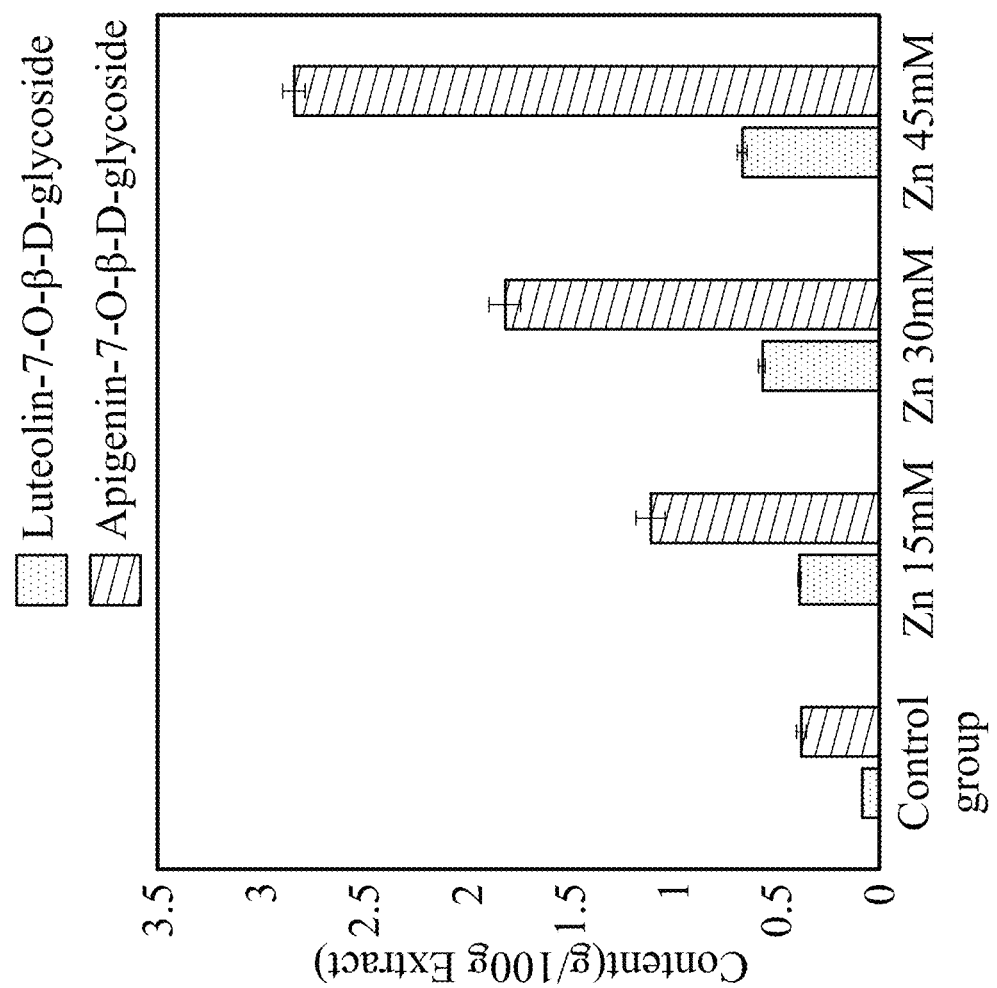
FIG. 4 shows the contents of luteolin-7-O-β-D-glycoside and apigenin-7-O-β-D-glycoside of whole plants of *Chrysanthemum morifolium* stimulated by different concentrations of Zn ion for 40 days in a solid medium culture environment.

The results are shown in FIG. 4.

FIG. 4 shows the contents of luteolin-7-O-β-D-glycoside and apigenin-7-O-β-D-glycoside of whole plants of Chrysanthemum morifolium stimulated by different concentrations of Zn ion for 40 days in a solid medium culture environment.

Based on FIG. 4, it is known that, compared to the control group, the contents of luteolin-7-O-β-D-glycoside and apigenin-7-O-β-D-glycoside belonging to flavonoid compounds of the plants stimulated by Zn ions are significantly increased about sevenfold to eightfold. This result confirms that Zn ion stimulation has the effect of inducing the accumulation of flavonoid ingredients in plants.

Example 5

Effects of different lengths of time of ultraviolet irradiation on the total flavonoid content of plant in a solid medium culture environment A. Methods 1. MS solid medium was prepared according to the formulation of Table 2 shown above for ready for use.

2. A terminal bud of a tissue culture seedling of Chrysanthemum morifolium (young shoot of Chrysanthemum morifolium) was cut and placed in a flask containing the solid medium prepared above (no addition of ion for stimulating) and inserted into the solid medium, and the flask was capped with a cap to perform the solid medium culture. After the roots of the plants began to develop, the plant was allowed to continue to grow so that the roots were allowed to fully deploy in the medium. The culture time was expected to be 16 weeks, so that the number of leaves of young shoots was increased, and the area where the plants receive UV irradiation could also be increased.

3. After 16 weeks of culture, the caps for the flasks were opened and the plants were irradiated with ultraviolet B for 0, 1, 2, 3 and 4 hours, respectively. After the irradiation, the flasks were capped with the caps to reduce the evaporation of water from the plants and the plants were allowed to recover for 1 hour. After the recovery, the samples of whole plants were collected, and the collected samples were lyophilized.

After the lyophilization, extraction was performed on the whole plant of Chrysanthemum morifolium. The extraction method used was water extraction, and the dried plant and deionized water were mixed at a ratio of 1:20 (g/mL) (i.e., 1 g dry weight of plant was added to 20 mL of deionized water) to form a mixture. Using a condensing heating system, the mixture was heated to boiling for 90 minutes to complete the extraction and obtain an extract solution. The plant residue in the extract solution was removed by filtration, and then the extract solution was further lyophilized to obtain an extract.

6. Quantitative analysis of total flavonoids was performed on the extracts mentioned above.

B. Results

Figure 5:
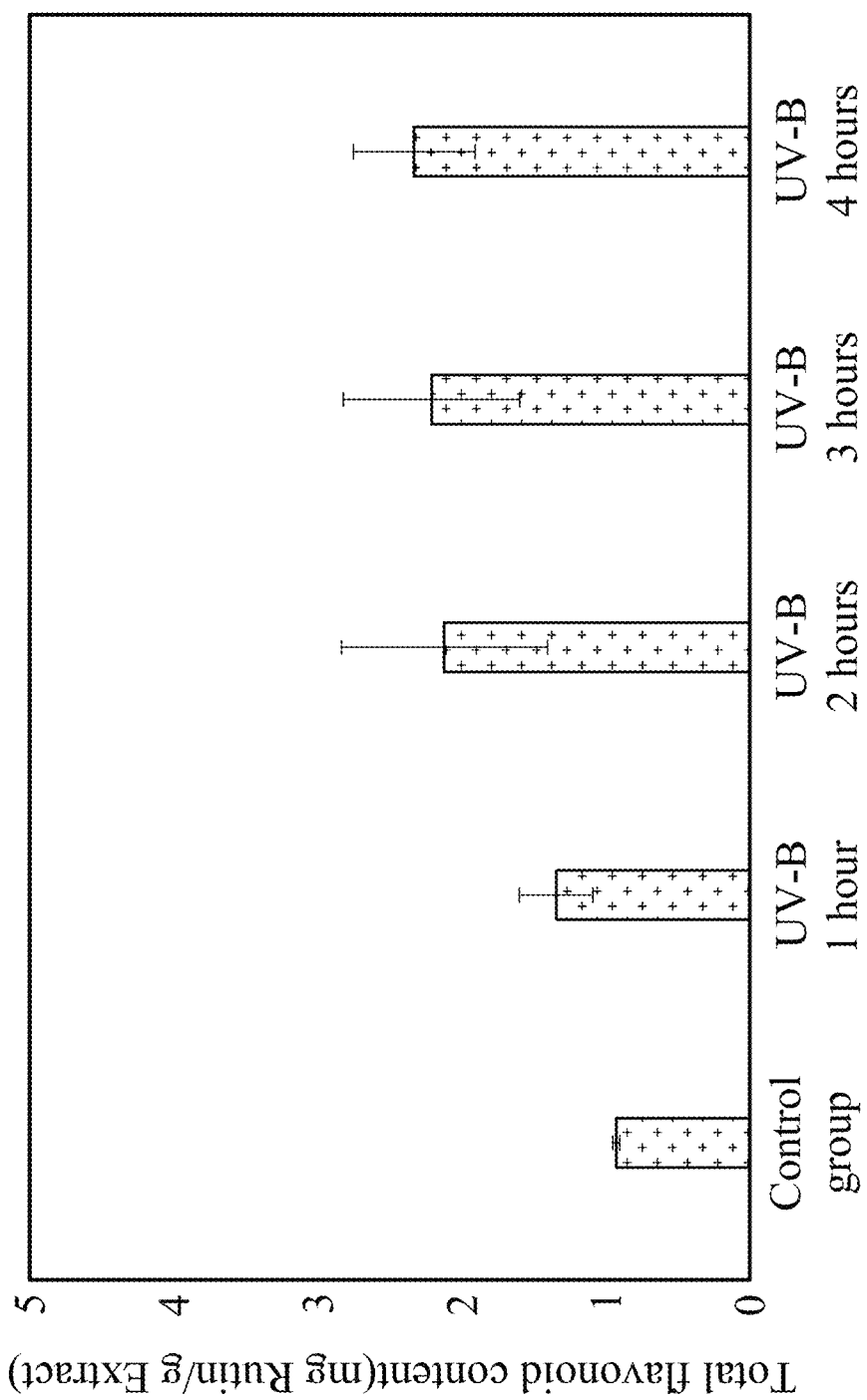
FIG. 5 shows the total flavonoid content of whole *Chrysanthemum morifolium* irradiated with ultraviolet for different lengths of time in a solid medium culture environment.

The results are shown in FIG. 5

FIG. 5 shows the total flavonoid content of whole plant of Chrysanthemum morifolium irradiated with ultraviolet for different lengths of time in a solid medium culture environment.

According to FIG. 5, it is known that the total flavonoid content of the plants irradiated with ultraviolet B was significantly improved as compared to the control group. Moreover, the irradiation with ultraviolet B within 2 hours increased the content of total flavonoids significantly while the content of total flavonoids showed a slight increase after irradiation with ultraviolet B for more than 2 hours. This result confirmed that irradiation with ultraviolet B has the effect of increasing the accumulation of flavonoids in plants under solid medium culture environment.

Example 6

Figure 6:
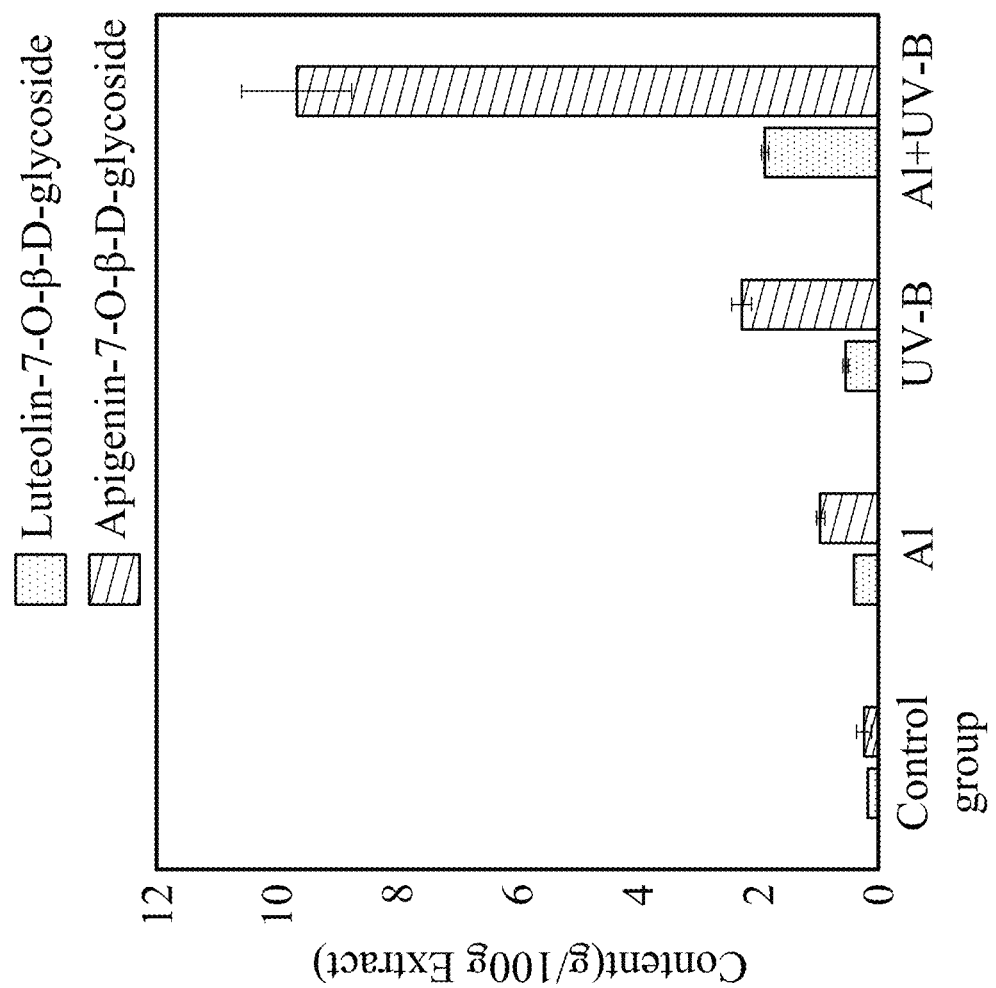
FIG. 6 shows the contents of luteolin-7-O-β-D-glycoside and apigenin-7-O-β-D-glycoside of whole plants of *Chrysanthemum morifolium* which are stimulated by Al ions alone, irradiated with ultraviolet alone, and stimulated by Al ions and ultraviolet irradiation in a hydroponic culture environment.

Effects of Al ion stimulation alone, ultraviolet irradiation alone, and combination of Al ion stimulation and ultraviolet irradiation on contents of luteolin-7-O-β-D-glycoside and apigenin-7-O-β-D-glycoside of whole plant of *Chrysanthemum morifolium* in a hydroponic culture environment
1. MS liquid medium was prepared based on the formulation of Table 1 shown above.
2. Different amounts of AlCl₃ solution were added to the MS liquid medium prepared above to respectively form MS liquid mediums with AlCl₃ final concentrations of 0 µM (control group) and 250 µM for ready for use.
3. Tissue culture seedlings of *Chrysanthemum morifolium* (young shoot of *Chrysanthemum morifolium*) were taken out from solid culture tubes. After that, the solid medium on the roots of the plants were washed with water, and the whole plants were inserted into test tubes containing the MS liquid medium with different AlCl₃ final concentration prepared above, and the roots of the plant were immersed in the liquid medium. Finally, the above-ground parts of the plants were covered with sealed bags to protect the cuticula on the surfaces of the plant leaves to prevent rapid evapotranspiration of water.
4. At the 97th hour of the immersion, the plants were irradiated with ultraviolet B for 1 hour. The plants were then allowed to recover for 1 hour. After the recovery, the morphological changes of the plants were observed and samples of whole plants were collected. Then, the collected samples were lyophilized.
5. After the lyophilization, extraction was performed on the whole plant of *Chrysanthemum morifolium*. The extraction method used was water extraction, and the dried plant and deionized water were mixed at a ratio of 1:20 (g/mL) (i.e., 1 g dry weight of plant was added to 20 mL of deionized water) to form a mixture. Using a condensing heating system, the mixture was heated to boiling for 90 minutes to complete the extraction and obtain an extract solution. The plant residue in the extract solution was removed by filtration, and then the extract solution was further lyophilized to obtain an extract.
6. High-performance liquid chromatography was performed on the extract mentioned above to determine the contents of luteolin-7-O-β-D-glycoside and apigenin-7-0-O-D-glycoside which belong to flavonoid compounds.
B. Results
The results are shown in FIG. 6.
FIG. 6 shows the contents of luteolin-7-O-β-D-glycoside and apigenin-7-O-β-D-glycoside of whole plants of *Chrysanthemum morifolium* which are stimulated by Al ions alone, irradiated with ultraviolet alone, and stimulated by Al ions and ultraviolet irradiation in a hydroponic culture environment.
According to FIG. 6, it is known that, compared to the control group, for the plants stimulated by Al ions alone, the plants irradiated with ultraviolet alone, and the plants stimulated by Al ions and ultraviolet irradiation, the contents of luteolin-7-O-β-D-glycoside and apigenin-7-O-β-D-glycoside belonging to the flavonoid compounds of all were increased, and the contents of luteolin-7-O-β-D-glycoside and apigenin-7-O-β-D-glycoside belonging to the flavonoid compounds of the plants stimulated by Al ions and ultraviolet irradiation significantly increased to about 40-fold. This result confirmed that, compared to Al ion stimulation alone or ultraviolet irradiation alone, the combination of Al ion stimulation and ultraviolet irradiation had additive or synergistic effects on inducing plants to increase the content of their flavonoid compounds.

Example 7

Figure 7A:
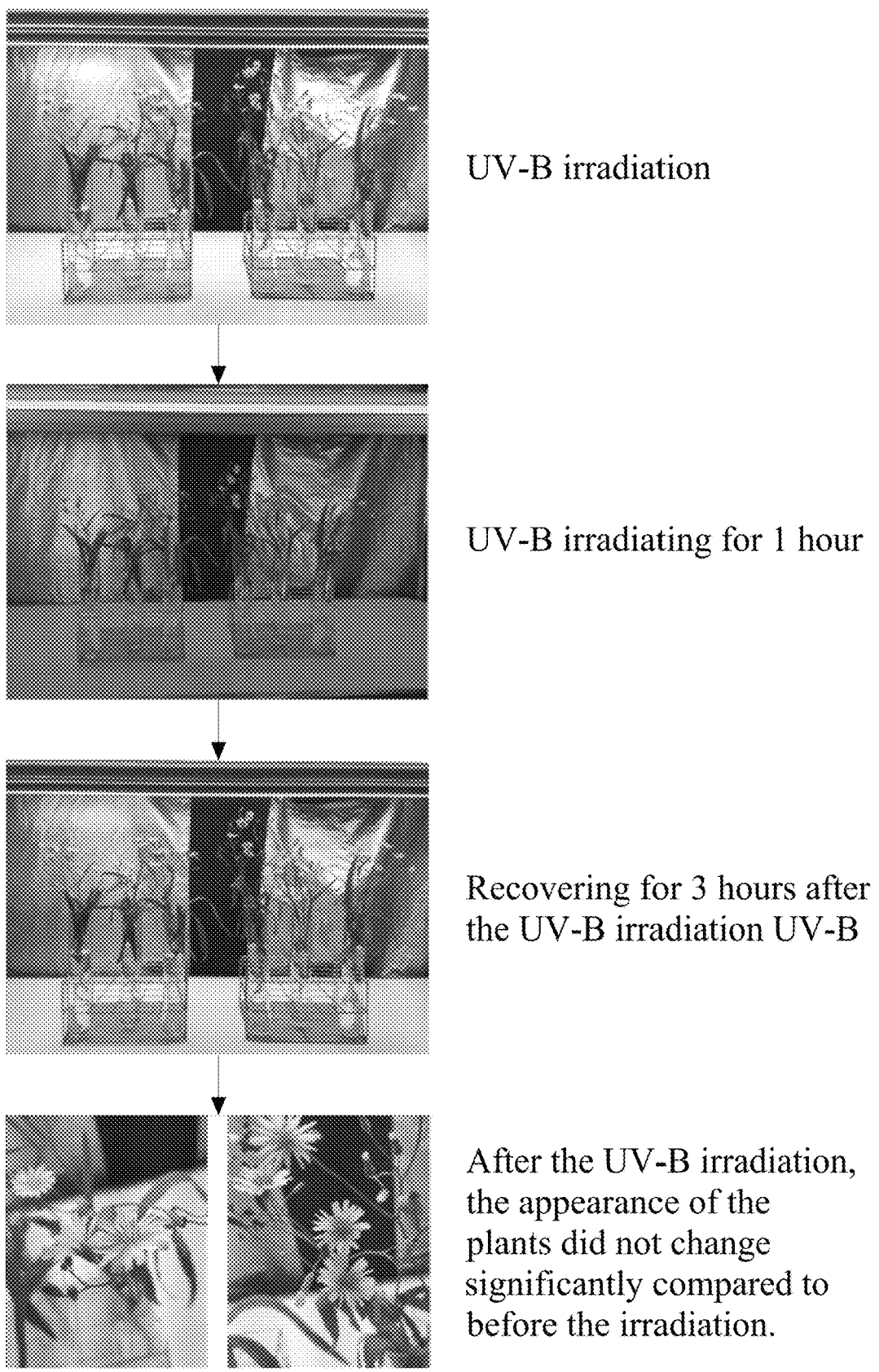
FIG. 7A is a photograph showing the appearance of *Ixeris chinensis* before the ultraviolet irradiation, during ultraviolet irradiation and after the ultraviolet irradiation, under Al ion stimulation.
Figure 7B:
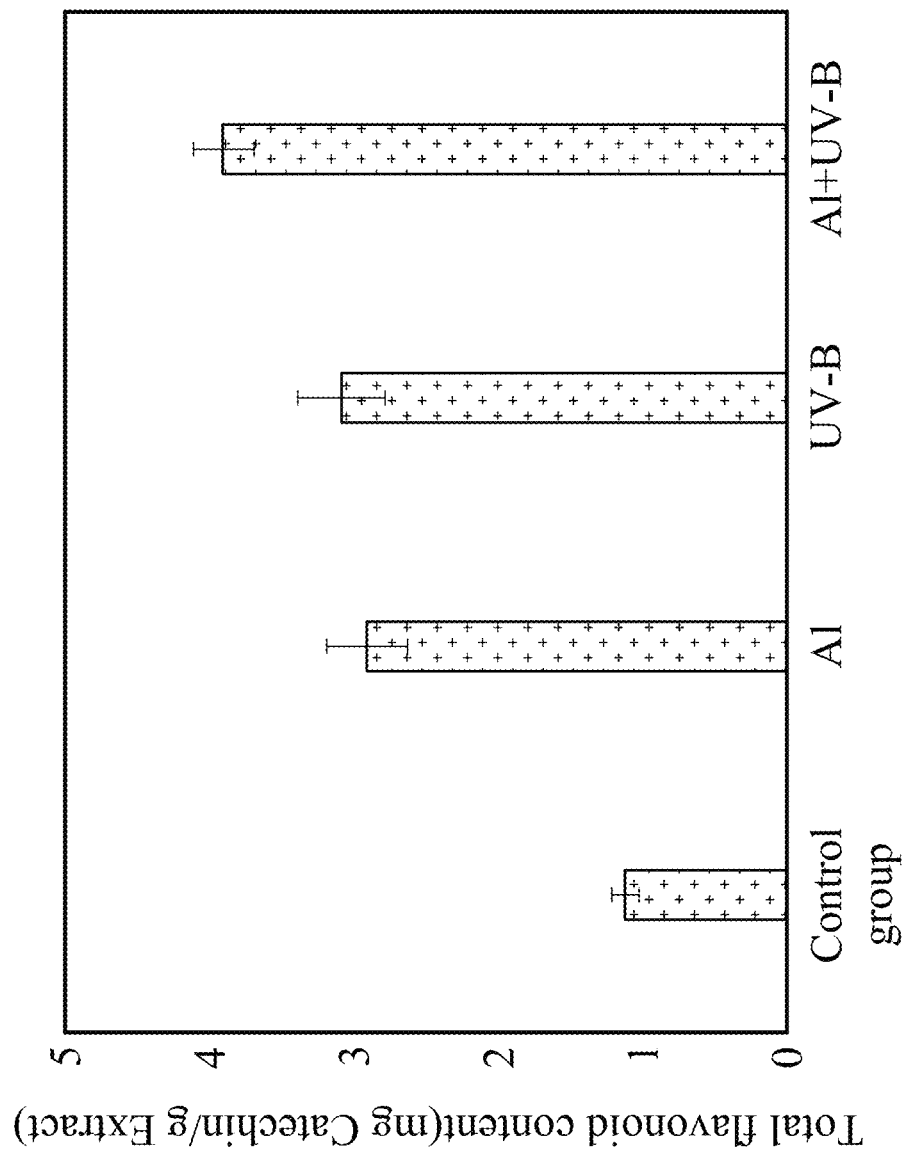
FIG. 7B shows the total flavonoid contents of the flowers and pedicels of *Ixeris chinensis* plants which are stimulated by Al ions alone, irradiated with ultraviolet alone, and stimulated by Al ions and ultraviolet irradiation in a hydroponic culture environment.

Effects of Al ion stimulation alone, ultraviolet irradiation alone, and combination of Al ion stimulation and ultraviolet irradiation on total flavonoid content of flowers and pedicels of *Ixeris chinensis* in a hydroponic culture environment
1. MS liquid medium was prepared according to the formulation of Table 1 shown above.
2. Different amounts of AlCl₃ solution were added to the MS liquid medium prepared above to respectively form MS liquid mediums with AlCl₃ final concentrations of 0 mM (control group) and 1.25 mM for ready for use.
3. *Ixeris chinensis* plants were sampled from the field. Leaves and pedicels of the above-ground part and root of the under-ground part of the *Ixeris chinensis* plant were wiped and wash with water and the root were allowed in a form of bare root. After that, the whole plant was inserted into a test tube containing the MS liquid medium with AlCl₃ prepared above, and the root of the plant was immersed in the liquid medium.
4. At the 73th hour of the immersion, the plants were irradiated with ultraviolet B for 1 hour. The plants were then allowed to recover for 3 hour. After the recovery, the morphological changes of the plants were observed and samples of flowers and pedicels were collected. Then, the collected samples were lyophilized.
5. The collected flowers and pedicels of the fresh plant were extracted with 30% ethanol and subjected to total flavonoid content analysis.
B. Results
The results are shown in FIGS. 7A and 7B.
FIG. 7A is a photograph showing the appearance of *Ixeris chinensis* before the ultraviolet irradiation, during ultraviolet irradiation and after ultraviolet irradiation, under Al ion stimulation. FIG. 7B shows the total flavonoid contents of the flowers and pedicels of *Ixeris chinensis* plants which are stimulated by Al ions alone, irradiated with ultraviolet alone, and stimulated by Al ions and ultraviolet irradiation in a hydroponic culture environment.
According to FIG. 7A, it is known that there is no significant difference among the appearance of *Ixeris chinensis* plants before the ultraviolet irradiation and after the ultraviolet irradiation, under Al ion stimulation, and this shows that the Al ion concentration and the dose of ultraviolet irradiation used in this experiment are reasonable doses for use.
Moreover, according to FIG. 7B, it is known that, compared to the control group, for the plants stimulated by Al ions alone, the plants irradiated with ultraviolet alone, and the plants stimulated by Al ions and ultraviolet irradiation, the total flavonoid contents of all were increased, and the total flavonoid contents of the plants stimulated by Al ions and ultraviolet irradiation significantly increased to about 3.5-fold. This result confirmed that, compared to Al ion stimulation alone or ultraviolet irradiation alone, the combination of Al ion stimulation and ultraviolet irradiation had additive or synergistic effects on inducing plants to increase the content of their flavonoid compounds.

Example 8

Effects of Cu ion stimulation alone, ultraviolet irradiation alone, and combination of Al ion stimulation and ultraviolet irradiation on contents of luteolin-7-O-β-D-glycoside and apigenin-7-O-β-D-glycoside of whole plant of *Chrysanthemum morifolium* in a hydroponic culture environment 1. MS liquid medium was prepared according to the formulation of Table 1 shown above.
2. Different amounts of $CuSO_4$ solution were added to the MS liquid medium prepared above to respectively form MS liquid mediums with $CuSO_4$ final concentrations of 0 μM (control group) and 250 μM for ready for use.
3. Tissue culture seedlings of *Chrysanthemum morifolium* (young shoot of *Chrysanthemum morifolium*) were taken out from solid culture tubes. After that, the solid medium on the roots of the plants were washed with water, and the whole plants were inserted into a test tube containing the MS liquid medium with different $CuSO_4$ final concentration prepared above, and the roots of the plants were immersed in the liquid medium. Finally, the above-ground parts of the plants were covered with sealed bags to protect the cuticula on the surfaces of the plant leaves to prevent rapid evapotranspiration of water.
4. At the 97th hour of the immersion the plants were irradiated with ultraviolet B for 1 hour. The plants were then allowed to recover for 1 hour. After the recovery, the plant type changes were observed and whole plant samples were collected. Then, the collected samples were lyophilized.
5. After the lyophilization, extraction was performed on the whole plant of *Chrysanthemum morifolium*. The extraction method used was water extraction, and the dried plant and deionized water were mixed at a ratio of 1:20 (g/mL) (i.e., 1 g dry weight of plant was added to 20 mL of deionized water) to form a mixture. Using a condensing heating system, the mixture was heated to boiling for 90 minutes to complete the extraction and obtain an extract solution. The plant residue in the extract solution was removed by filtration, and then the extract solution was further lyophilized to obtain an extract.
6. High-performance liquid chromatography was performed on the extract mentioned above to determine the contents of luteolin-7-O-β-D-glycoside and apigenin-7-O-β-D-glycoside which belong to flavonoid compounds.

B. Results

Figure 8:
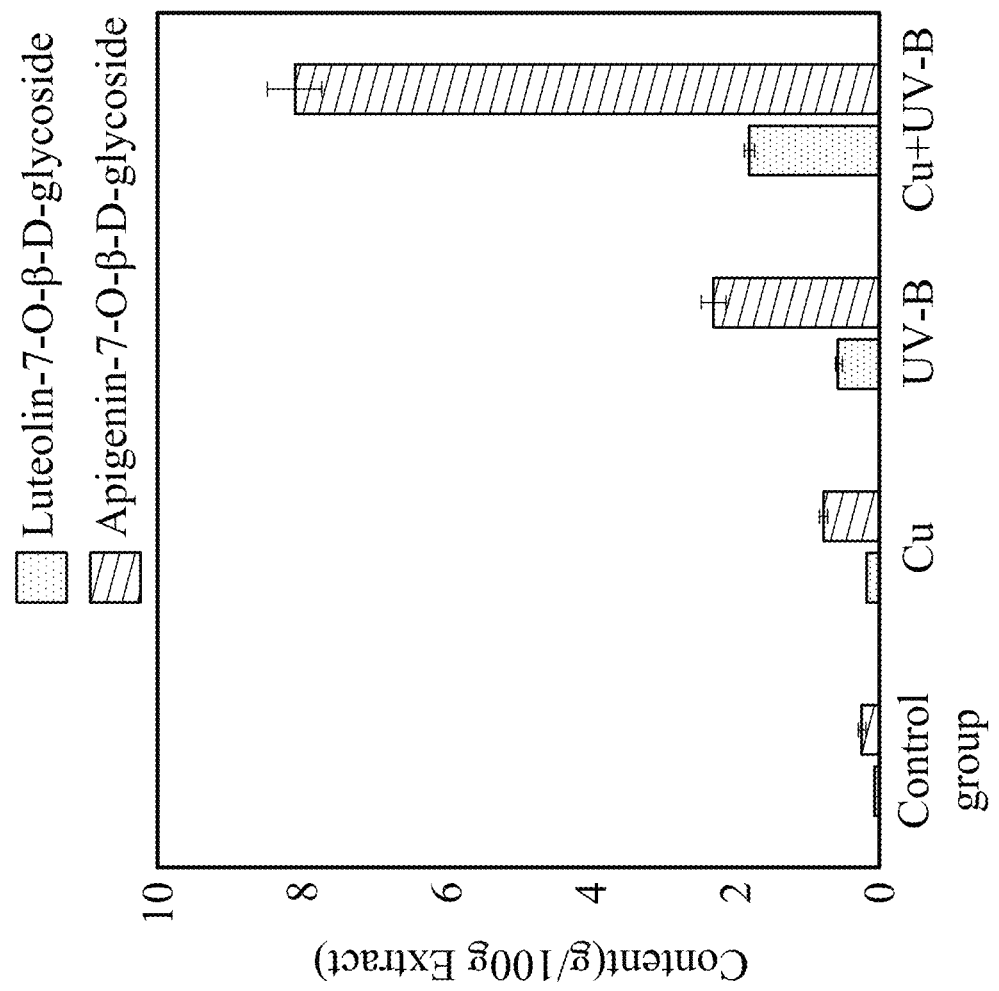
FIG. 8 shows the contents of luteolin-7-O-β-D-glycoside and apigenin-7-O-β-D-glycoside of whole plants of *Chrysanthemum morifolium* which are stimulated by Cu ions alone, irradiated with ultraviolet alone, and stimulated by Cu ions and ultraviolet irradiation in a hydroponic culture environment.

The results are shown in FIG. 8.

FIG. 8 shows the contents of luteolin-7-O-β-D-glycoside and apigenin-7-O-β-D-glycoside of whole plants of *Chrysanthemum morifolium* which are stimulated by Cu ions alone, irradiated with ultraviolet alone, and stimulated by Cu ions and ultraviolet irradiation in a hydroponic culture environment.

According to FIG. 8, it is known that, compared to the control group, for the plants stimulated by Cu ions alone, the plants irradiated with ultraviolet alone, and the plants stimulated by Cu ions and ultraviolet irradiation, the contents of luteolin-7-O-β-D-glycoside and apigenin-7-O-β-D-glycoside belonging to the flavonoid compounds of all were increased, and the contents of luteolin-7-O-β-D-glycoside and apigenin-7-O-β-D-glycoside belonging to the flavonoid compounds of the plants stimulated by Cu ions and ultraviolet irradiation significantly increased to about 37-fold.

This result confirmed that, compared to Cu ion stimulation alone or ultraviolet irradiation alone, the combination of Cu ion stimulation and ultraviolet irradiation had additive or synergistic effects on inducing plants to increase the content of flavonoid compounds.

Example 9

Effects of Al ion stimulation alone, ultraviolet irradiation alone, and combination of Al ion stimulation and ultraviolet irradiation on total flavonoid content of whole plant of *Chrysanthemum morifolium* in a solid medium culture environment A. Methods 1. Different amounts of $AlCl_3$ were added to the formulation of Table 2 shown above to respectively form MS solid mediums with final concentration of 0 μM (control group) and 350 μM for ready for use.
2. A terminal bud of a tissue culture seedling of *Chrysanthemum morifolium* (young shoot of *Chrysanthemum morifolium*) was cut and inserted to a solid medium without addition of the stimulation ion. After the plant had grown roots, the root part of the plant having the root with a length of less than 0.5 cm was inserted to the solid medium prepared above to perform the solid medium culture.
3. On the 41st day of the culture, the plants were irradiated with ultraviolet B for 0, 1, 2 and 4 hours, respectively. The plants were then allowed to recover for 3 hours. After the recovery, the morphological changes of the plants were observed and samples of whole plants (plants stimulated by Al ions alone, plants irradiated with 1 hour of ultraviolet alone, and plants stimulated by Al ions and 1, 2, and 4 hours of ultraviolet irradiation were obtained) were collected. After that, the collected samples were lyophilized.
4. After the lyophilization, extraction was performed on the whole plant. The extraction method used was water extraction, and the dried plant and deionized water were mixed at a ratio of 1:20 (g/mL) (i.e., 1 g dry weight of plant was added to 20 mL of deionized water) to form a mixture. Using a condensing heating system, the mixture was heated to boiling for 90 minutes to complete the extraction and obtain an extract solution. The plant residue in the extract solution was removed by filtration, and then the extract solution was further lyophilized to obtain an extract.
5. Quantitative analysis of total flavonoids was performed on the extracts mentioned above.

Figure 9:
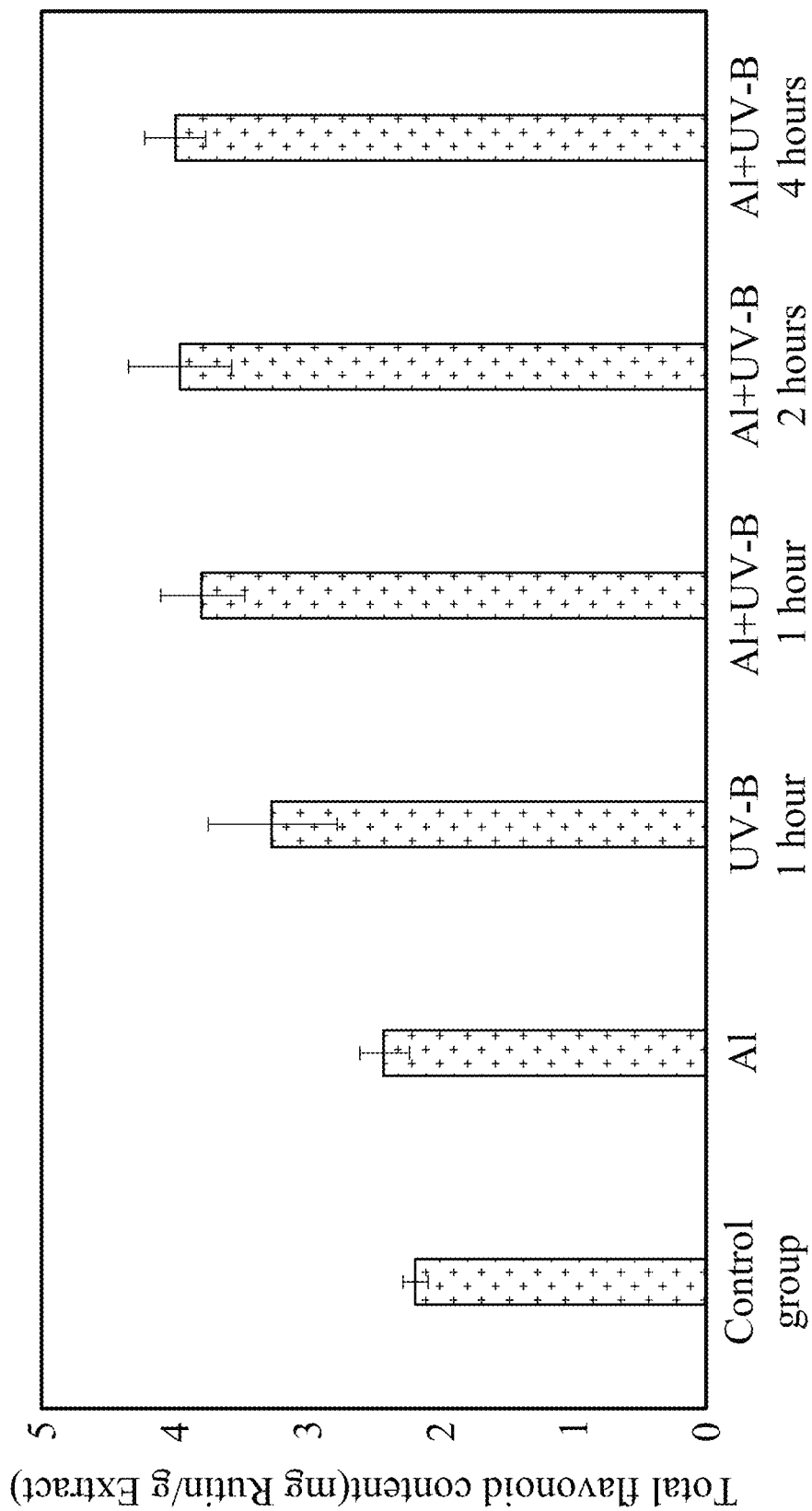
FIG. 9 shows the total flavonoid content of whole plant of *Chrysanthemum morifolium* which are stimulated by Al ions alone, irradiated with ultraviolet alone, and stimulated by Al ions and ultraviolet irradiation in a solid medium culture environment.

FIG. 9 shows the total flavonoid content of whole plant of *Chrysanthemum morifolium* which are stimulated by Al ions alone, irradiated with ultraviolet alone, and stimulated by Al ions and ultraviolet irradiation in a solid medium culture environment.

According to FIG. 9, it is known that, compared to the control group, for the plants stimulated by Al ions alone, the plants irradiated with ultraviolet alone, and the plants stimulated by Al ions and ultraviolet irradiation, the total flavonoid contents of all were increased. This result confirmed that, compared to Al ion stimulation alone or ultraviolet irradiation alone, the combination of Al ion stimulation and ultraviolet irradiation had additive or synergistic effects on inducing plants to increase the content of flavonoid compounds.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for inducing plants to increase their flavonoid compound content, comprising:
performing an induction culture on a young shoot or an adult of a living plant, wherein flavonoid compound content of the young shoot or the adult of the living plant which has been subjected to the induction culture is higher than that of a young shoot or an adult of a living plant which is not subjected to the induction culture, and
wherein the induction culture comprises:
a metal ion stimulation procedure comprising culturing the young shoot or the adult of the living plant in a culture environment with metal ion stimulation; and
an ultraviolet irradiation procedure to irradiate the young shoot or the adult of the living plant with ultraviolet,
wherein the culture environment with metal ion stimulation contains a metal ion used for stimulating the living plant, and the concentration of the metal ion used for stimulating the living plant is 5 μM-50 μM.

2. The method for inducing plants to increase their flavonoid compound content as claimed in claim 1, wherein the living plant comprises a plant belonging to the family Asteraceae.

3. The method for inducing plants to increase their flavonoid compound content as claimed in claim 2, wherein the plant belonging to the family Asteraceae comprises a plant belonging to the genus *Chrysanthemum* or the genus *Ixeris*.

4. The method for inducing plants to increase their flavonoid compound content as claimed in claim 3, wherein the plant belonging to the genus *Chrysanthemum* comprises *Chrysanthemum morifolium, Chrysanthemum coronarium* or *Chrysanthemum indicum*.

5. The method for inducing plants to increase their flavonoid compound content as claimed in claim 3, wherein the plant belonging to the genus *Ixeris* comprises *Ixeris chinensis* or *Ixeris dentate*.

6. The method for inducing plants to increase their flavonoid compound content as claimed in claim 1, wherein the flavonoid compound content is total flavonoid content.

7. The method for inducing plants to increase their flavonoid compound content as claimed in claim 1, wherein the flavonoid compound content is a content of at least one selected from a group consisting of: luteolin, luteolin-7-O-β-D-glycoside, apigenin, apigenin-7-O-β-D-glycoside, catechin and rutin.

8. The method for inducing plants to increase their flavonoid compound content as claimed in claim 1, wherein time it takes to perform the metal ion stimulation procedure is 5 hours-50 days.

9. The method for inducing plants to increase their flavonoid compound content as claimed in claim 1, wherein the culture environment with metal ion stimulation comprises a hydroponic culture, a solid medium culture or a soil culture.

10. The method for inducing plants to increase their flavonoid compound content as claimed in claim 1, wherein the culture environment with metal ion stimulation is a hydroponic culture, and time it takes to perform the metal ion stimulation procedure is 5-120 hours.

11. The method for inducing plants to increase their flavonoid compound content as claimed in claim 1, wherein the culture environment with metal ion stimulation is a solid medium culture, and time it takes to perform the metal ion stimulation procedure is 20-50 days.

12. The method for inducing plants to increase their flavonoid compound content as claimed in claim 1, wherein the culture environment with metal ion stimulation is a soil culture, and time it takes to perform the metal ion stimulation procedure is 5-120 hours.

13. The method for inducing plants to increase their flavonoid compound content as claimed in claim 1, wherein the culture environment with metal ion stimulation is a hydroponic culture, and the concentration of the metal ion used for stimulating the living plant is 5 μM-50 mM.

14. The method for inducing plants to increase their flavonoid compound content as claimed in claim 1, wherein the culture environment with metal ion stimulation is a solid medium culture, and the concentration of the metal ion used for stimulating the living plant is 50 μM-50 mM.

15. The method for inducing plants to increase their flavonoid compound content as claimed in claim 1, wherein the culture environment with metal ion stimulation is a soil culture, and the concentration of the metal ion used for stimulating the living plant is 0.5 mM-50 mM.

16. The method for inducing plants to increase their flavonoid compound content as claimed in claim 1, wherein the metal ion used for stimulating the living plant is at least one selected from a group consisting of aluminum ion, copper ion and zinc ion.

17. The method for inducing plants to increase their flavonoid compound content as claimed in claim 1, wherein the culture environment with metal ion stimulation is a hydroponic culture, and the metal ion used for stimulating the living plant is aluminum ion or copper ion, and the concentration of the metal ion used for stimulating the living plant is 5 μM-5 mM.

18. The method for inducing plants to increase their flavonoid compound content as claimed in claim 1, wherein the culture environment with metal ion stimulation is a solid medium culture, and the metal ion used for stimulating the living plant is aluminum ion or copper ion, and the concentration of the metal ion used for stimulating the living plant is 50 μM-5 mM.

19. The method for inducing plants to increase their flavonoid compound content as claimed in claim 1, wherein the culture environment with metal ion stimulation is a solid medium culture, and the metal ion used for stimulating the living plant is zinc ion, and the concentration of the metal ion used for stimulating the living plant is 3.5 mM-50 mM.

20. The method for inducing plants to increase their flavonoid compound content as claimed in claim 1, wherein the culture environment with metal ion stimulation is a soil culture, and the metal ion used for stimulating the living plant is aluminum ion, and the concentration of the metal ion used for stimulating the living plant is 0.5 mM-50 mM.

21. The method for inducing plants to increase their flavonoid compound content as claimed in claim 1, wherein the ultraviolet irradiation procedure is performed during the metal ion stimulation procedure or after the end of the metal ion stimulation procedure.

22. The method for inducing plants to increase their flavonoid compound content as claimed in claim 1, wherein the ultraviolet irradiation procedure is performed during the metal ion stimulation procedure and after the beginning of the metal ion stimulation procedure.

23. The method for inducing plants to increase their flavonoid compound content as claimed in claim 1, wherein time it takes to perform the ultraviolet irradiation procedure is 0.5-5 hours.

24. The method for inducing plants to increase their flavonoid compound content as claimed in claim 1, wherein the ultraviolet used in the ultraviolet irradiation procedure is ultraviolet B (UV-B).

25. The method for inducing plants to increase their flavonoid compound content as claimed in claim 1, wherein the culture environment with metal ion stimulation is a hydroponic culture, and the concentration of the metal ion used for stimulating the living plant is 5 μM-50 mM, and time it takes to perform the metal ion stimulation procedure is 5-120 hours, wherein the ultraviolet irradiation procedure is performed during the metal ion stimulation procedure and after 4.5-115 hours from the beginning of the metal ion stimulation procedure, and time it takes to perform the ultraviolet irradiation procedure is 0.5-5 hours.

26. The method for inducing plants to increase their flavonoid compound content as claimed in claim 1, wherein the culture environment with metal ion stimulation is a solid medium culture, and the concentration of the metal ion used for stimulating the living plant is 50 μM-50 mM, and the time it takes to perform the metal ion stimulation procedure is 20-50 days, wherein the ultraviolet irradiation procedure is performed during the metal ion stimulation procedure and after 19-49 days from the beginning of the metal ion stimulation procedure, and time it takes to perform the ultraviolet irradiation procedure is 0.5-5 hours.

27. The method for inducing plants to increase their flavonoid compound content as claimed in claim 1, wherein the culture environment with metal ion stimulation is a soil culture, and the concentration of the metal ion used for stimulating the living plant is 0.5 mM-50 mM, and the time it takes to perform the metal ion stimulation procedure is 5-120 hours, wherein the ultraviolet irradiation procedure is performed during the metal ion stimulation procedure and after 4.5-115 hours from the beginning of the metal ion stimulation procedure, and time it takes to perform the ultraviolet irradiation procedure is 0.5-5 hours.

28. The method for inducing plants to increase their flavonoid compound content as claimed in claim 1, wherein the induction culture further comprises a recovery procedure after the ultraviolet irradiation procedure, wherein the recovery procedure refers to giving time to let the young shoot or the adult of the living plant self-repair after ultraviolet irradiation stops.

29. The method for inducing plants to increase their flavonoid compound content as claimed in claim 28, wherein time it takes to perform the recovery procedure is 0.5-8 hours.

30. The method for inducing plants to increase their flavonoid compound content as claimed in claim 28, wherein the ultraviolet irradiation procedure and the recovery procedure both are performed during the metal ion stimulation procedure.

31. The method for inducing plants to increase their flavonoid compound content as claimed in claim 1, further comprising performing a extraction step on the young shoot or the adult of the living plant after the induction culture to extract the flavonoid compounds of the living plant.

32. The method for inducing plants to increase their flavonoid compound content as claimed in claim 31, wherein the culture environment with metal ion stimulation is a hydroponic culture or solid medium culture, and the young shoot or the adult of the living plant is the young shoot of the living plant, and the extraction step is performed on the whole plant of the living plant.

33. The method for inducing plants to increase their flavonoid compound content as claimed in claim 31, wherein the culture environment with metal ion stimulation is a hydroponic culture or solid medium culture, and the young shoot or the adult of the living plant is the adult of the living plant, and the extraction step is performed on the flowers and pedicels of the living plant.

34. The method for inducing plants to increase their flavonoid compound content as claimed in claim 31, wherein the culture environment with metal ion stimulation is a soil culture, and the young shoot or the adult of the living plant is the adult of the living plant, and the extraction step is performed on the flowers of the living plant.

\* \* \* \* \*